W. E. NICKERSON.
Cutter for Reducing Bark.
No. 201,938.               Patented April 2, 1878.
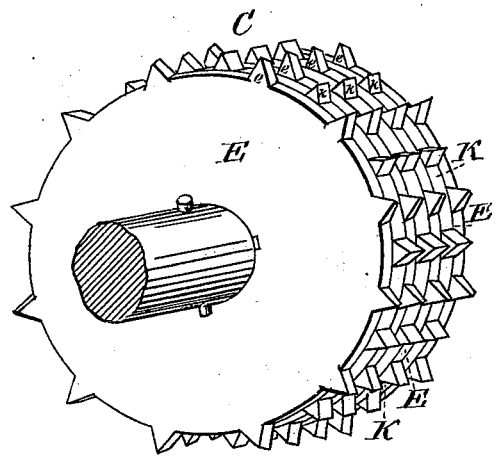
Fig. 1.
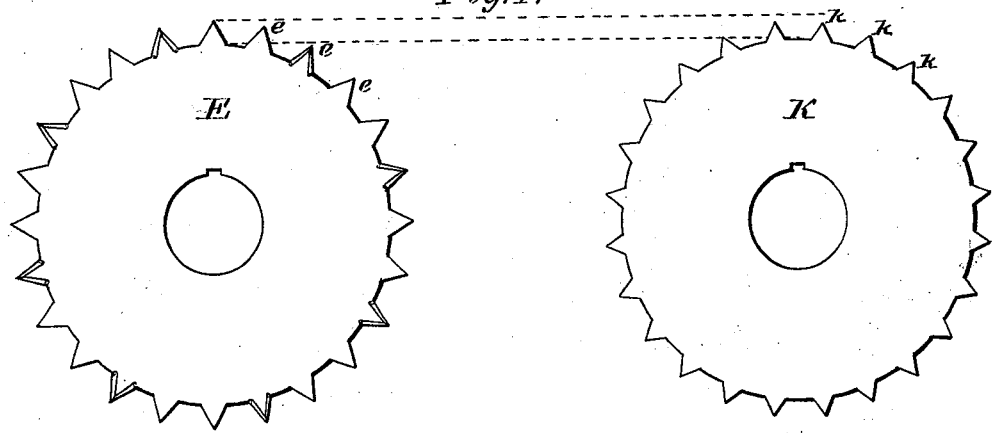
Fig. 2.                                Fig. 3.
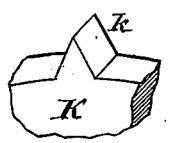   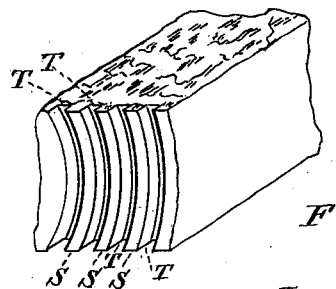
Fig. 4.                                Fig. 5.
Witnesses.                             Inventor.
S. W. Carlsen.
E. N. Boyden                    William Emery Nickerson

UNITED STATES PATENT OFFICE.

WILLIAM E. NICKERSON, OF SOMERVILLE, MASSACHUSETTS.

IMPROVEMENT IN CUTTERS FOR REDUCING BARK.

Specification forming part of Letters Patent No. 201,938, dated April 2, 1878; application filed December 26, 1877.

*To all whom it may concern:*

Be it known that I, WILLIAM EMERY NICKERSON, of Somerville, in the county of Middlesex and State of Massachusetts, have invented a certain new and useful Machine for Grinding Bark, of which the following is a specification:

My invention consists in an arrangement upon the surface of a cylinder of sets of projections, one set of the said projections acting as cutters, being sharpened and set similar to teeth in a sharp-set circular saw, the other set of projections surrounding the cylinder in rows alternating with the rows of the first-described projections. This second series of projections do not extend so far from the cylinder as the first series, and they strike the bark flatwise, scraping off the ridges that remain between the kerfs made by the first series of projections or cutters proper.

As the teeth that act as scrapers on the ridges never extend in their action to the depth of the kerfs, it is evident that no pieces can be knocked off that are longer than the distance between the kerfs.

Figure 1 is a perspective view, showing a part of the grinding-cylinder. Figs. 2 and 3 represent separate disks, which, when combined in series, compose my grinding-cylinder; Fig. 4, detail, showing one of the scraping-teeth. Fig. 5 represents a piece of bark, a part of which has been ground away, showing the kerfs and ridges as produced by my machine.

As all of the parts of my machine except the grinding-cylinder C are common devices, I shall give no description of them.

I construct my grinding-cylinder C of a series of sets of disks having teeth upon their peripheries, each alternate disk being provided with different kinds of teeth. The disks E are made with sharp saw-teeth, as shown at *e e*, Fig. 2. These teeth, or at least the most of them, are sharpened and set like the teeth of a crosscut-saw. If desirable, a few of them may be made in the shape shown in Fig. 4. The teeth on the alternating disks K are all formed in the shape shown in Fig. 4, and do not project so far as the teeth *e e* on the disk E.

In making up the cylinder C, I first place upon the arbor a disk like E, next a disk like K, and continue, by using alternately E and K, until the whole cylinder is made up. I then fasten them upon the arbor by any desirable means.

This grinding-cylinder acts upon the bark in two ways: first, the saw-teeth E, which project farther than the scraping-teeth *k k*, form kerfs in the bark, as shown at S S, leaving ridges T T, Fig. 5; second, the scraping-teeth *k k* act on the ridges T T, and reduce them to small particles.

By making the disks K thicker or thinner, thus increasing or diminishing the distance between the disks E, I can regulate the thickness of the ridges T T, and thus the dimensions of the pieces to be knocked off.

I claim as my invention—

The combination, on the cylinder C, of the set of kerf-forming teeth *e e e* with the ridge-reducing scrapers *k k k*, of less projection, substantially as described, and for the purpose set forth.

WM. E. NICKERSON.

Witnesses:
R. H. EDDY,
JOHN R. SNOW.